July 18, 1972  W. D. BOND  3,677,711
PLURAL CAVITY TOROIDAL FLOAT POOL CHEMICAL PACKAGE
Filed March 25, 1970
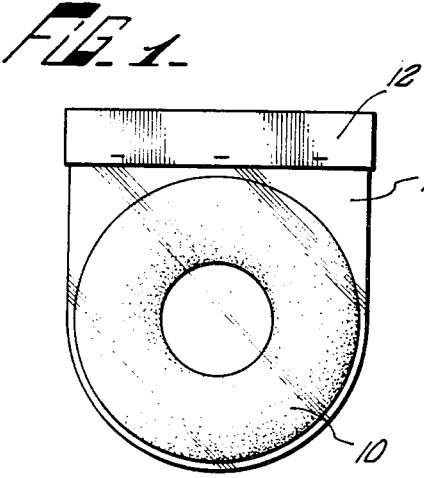
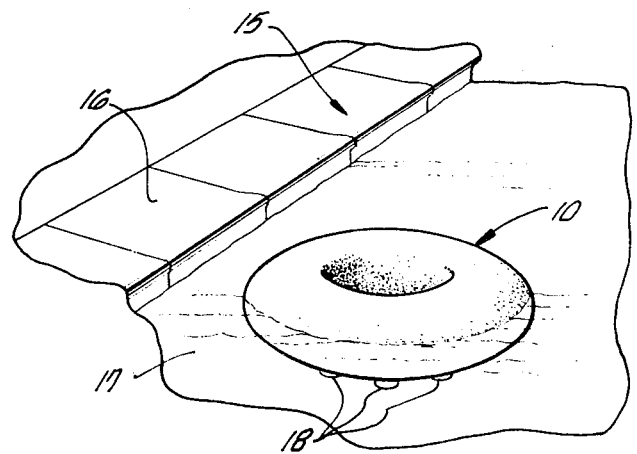
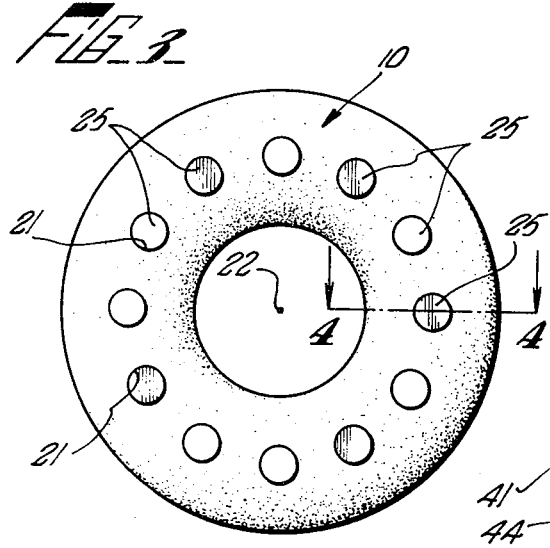
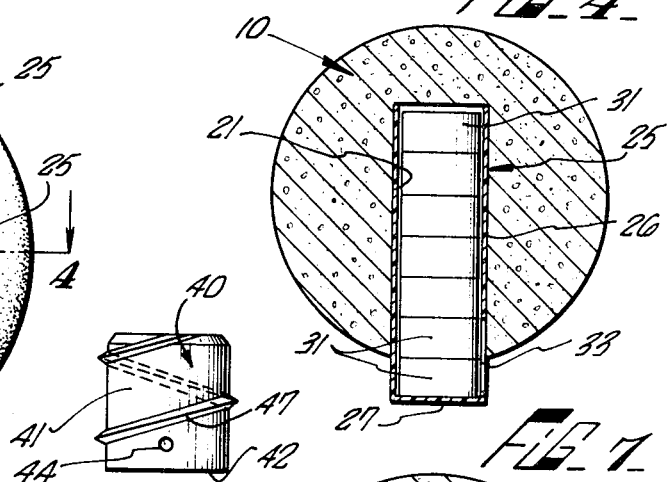
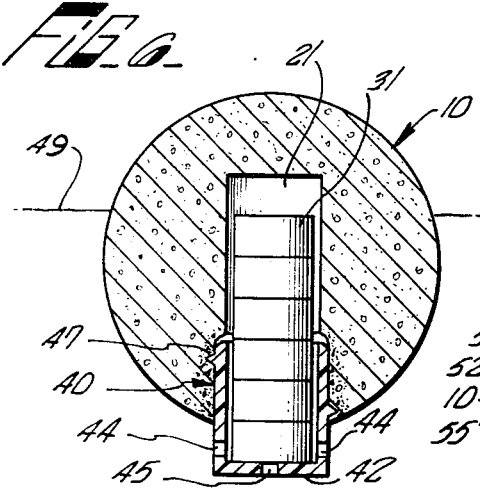
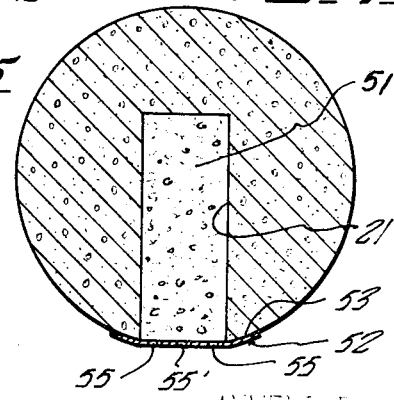
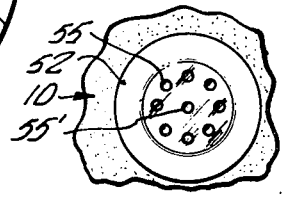
INVENTOR.
WILLIAM D. BOND
BY
W. J. Gribble
ATTORNEY.

3,677,711
PLURAL CAVITY TOROIDAL FLOAT POOL CHEMICAL PACKAGE
William D. Bond, Arcadia, Calif., assignor to World Industries, Inc., Azusa, Calif.
Filed Mar. 25, 1970, Ser. No. 22,556
Int. Cl. B01f 1/00
U.S. Cl. 23—267 A
2 Claims

ABSTRACT OF THE DISCLOSURE

A float ring contains cavities each filled with a soluble pool chemical such as chlorine tablets or granules. A tube cap protrudes an adjustable amount from each cavity of the float ring and an aperture of each tube is in the protruded portion. Each tube cap is adjustable in its float ring cavity to change the area of the tube cap aperture effectively open to pool water so as to alter the rate at which the chemical dissolves into the pool.

BACKGROUND OF THE INVENTION

Chemicals for swimming pool use are varied in form. For instance, chlorine, which is commonly used in swimming pools, is available in granules, large and small tablets and in concentrated liquid form. Conventionally each of these forms is differently packaged. Some of the chemicals are hand-scattered or introduced by elaborate automatic mechanical apparatus or by complicated floating release mechanisms, further increasing the variety of packaging desired, adding to cost to the consumer.

Many of the chlorine and other pool chemical distribution systems are unsightly when exposed in the pool area. The chemical distributors thereby detract from the decor of the pool in addition to being difficult to maintain because of their complicated operation.

The instant invention is therefore directed to a chemical package of pool harmonizing decor which also acts to distribute the chemical into the pool water, thereby obviating many of the difficulties set forth above.

SUMMARY OF THE INVENTION

The invention contemplates a chemical package and distribution device which may comprise a floatable body of toroidal configuration with a plurality of cavities in the ring opening in a common plane. Each cavity contains a supply of chemical which may be either in tablet or granular form. A tubular cap seals the chemical within each cavity such that the float body, when filled defines a chemical container which may be packaged in a plastic bag for distribution to retail sales outlets.

Each cap has one or more apertures exposed to the zone around the float ring. The caps, which may be tubular, are adjustable in the ring to vary the aperture area and thus regulate the flow of water to and from the chemical in the cavities. The amount of flow determines the rate at which the chemical dissolves and enters the surrounding pool water.

The chemical package of the invention is used by removing it from an outer wrap and placing it in the pool to be chemically treated. The float body sustains the chemical-filled cavities within a few inches of the pool surface. The float body moves across the pool surface under the urging of slight breezes or water agitation such that the chemical additive becomes dispersed through the pool.

In a preferred form of the invention the caps closing the chemicals within the ring cavities have a plurality of apertures, one of which is always exposed to the pool water and one or more of which may have their exposed area adjusted by movement of the cap with respect to the float body. For instance, a tube cap having a central aperture in its exposed end wall may have two or more apertures in the cylindrical side wall of the tube near the flat wall. By altering the projection of the tube cap from the float body the apertures in the cylindrical wall may be partially or totally overlapped by the cavity wall to preclude water circulation therethrough. In this manner the rate at which the contained chemical dissolves and enters the pool may be regulated.

The float body may be made of molded foam plastic, such as foamed polyurethane, and the tube caps may be made from polyvinylchloride or other readily formable plastics such that the cost of the package materials for the chemicals is relatively small.

The package of the invention therefore achieves the objective of a package adapted both to contain and to distribute the pool chemical with simplicity and at a low cost in an embodiment in harmony with the pool setting artistically.

These and other advantages of the invention are apparent from the following detailed description and drawing.

BRIEF DESCRIPTION OF THE DRAWING

FIG. 1 is an elevational view of a pool chemical package in accordance with the invention encased in a transparent sheet plastic wrap;

FIG. 2 is a fragmentary perspective view of a pool containing a chemical package in accordance with the invention;

FIG. 3 is a bottom plan view of the chemical package of FIG. 2;

FIG. 4 is a sectional elevation taken along line 4—4 of FIG. 3;

FIG. 5 is an elevational view of an adjustable cap for use in an alternate embodiment of the invention;

FIG. 6 is a sectional elevation similar to FIG. 4 showing the cap of FIG. 5 in combination with a float ring;

FIG. 7 is a sectional elevation similar to FIG. 4 showing a further alternate embodiment of the invention; and FIG. 8 is a fragmentary bottom plan view of the cap of the embodiment of FIG. 7.

In the various figures like parts are given like reference characters. While a toroidal float body is shown in the illustrative embodiments, bodies of other shapes adatped to the purpose of the invention may be used.

In FIG. 1 a toroidal float body 10, which may have an extreme diameter of 16 inches is encased within a transparent plastic envelope 11 which has a header 12 which not only seals the envelope but may carry the commercial message.

In FIG. 2 a pool generally designated at 15 has a coping 16 bounding the pool liquid 17. A toroidal float body 10 floats on the surface of pool 17. A plurality of tubular caps such as the caps 18 protrude into the pool liquid from the lower surface of the float body. The density of the float body is such that slight variations in air and water movement cause the body to move about onthe surface of the pool.

In FIG. 3 the float body 10 is shown from the underside, displaying a plurality of cavities 21, generally cylindrical in configuration, which extend centrally of the toroid and parallel to the central axis 22 of the float body. Each cavity 21 contains a cylindrical tube 25 which has a thin cylindrical wall 26 and a flat end wall 27 (see FIG. 3). Preferably the diameter of the toroid is approximately 5 inches, such that the cavities 21 can each extend approximately 3¾ inches into the toroid from what may be called the downward side of the float body. Each tube cap 25 is approximately 4 inches long and has an outside diameters slightly larger than the normal inside diameter of the cavities 21 such that the tube cap is firmly gripped when inserted into the float body cavities.

Each tube cap contains a plurality of chemical tablets 31. The tablets may be of solid soluble chlorine or other chemicals used in the treatment of pool water to combat fungi, algae, bacteria and other water pollutants. The chemicals may also be of concentrated acids sometimes necessary to balance the chemistry of the pool in cases where chemical imbalance has occurred through inadvertent oversupply of other chemicals or decomposition of chemicals in the pool water due to age or excessive sunlight, etc. The tablets are slightly smaller in diameter than the inner diameter of the tube 25 to allow for liquid circulation.

In the embodiment shown in FIGS. 1–4, the tubular cap 25 has one or more longitudinal slots 33 in the cylindrical wall of the tube cap. Each slot is near the cap end wall 27 such that at least a part of the slot is always exposed to pool water. Preferably slot 33 extends longitudinally such that a part of the slot is overlapped by the cavity wall when the tube cap 25 is fully inserted into the float body cavity.

Prior to disposing the float body and its contained chemicals in the pool, the protrusion of the tube cap retaining the tablets within the cavities may be altered in accordance with the volume of the pool and the chemical condition of the pool water. For instance, a faster dissolving rate for the tablets 31 may be achieved in the embodiment of FIG. 4 if tube cap 25 is pulled from the float body such that more of slot 33 is exposed to pool water. One or more of the plurality of tube caps may be thus adjusted, although normally each of the tube caps is similarly adjusted to achieved the desired rate of chemical exchange with the pool water.

The mode of operation of the device of FIGS. 1–4 is very simple. The outer envelope 11 is removed from the pool chemical package, the tube caps are adjusted such that the apertures 33 afford the requisite liquid circulation for the pool volume and chemical condition, and the package 10 is then tossed into the pool to ride on the water surface.

DESCRIPTION OF THE PREFERRED EMBODIMENT

It may be desirable to afford tube caps which are more securely fixable with respect to their projection from the float body cavity than the previously described embodiment. The embodiment of FIGS. 5 and 6 therefore provides a tube cap for each float body cavity wherein the cap has a cylindrical wall 41 and a planar bottom wall 42 each perforated by cylindrical apertures 44, 45, respectively. A helical bead 47 extends from the exterior wall 41 of the tube cap. Apertures 44 are approximately ⅛ inch in diameter and oppositely located in the wall 41 adjacent the inner surface of cap wall 42. Aperture 45 may be of similar size and is centrally located in wall 42.

The inside diameters of the cavities 25 of float body 10 in FIG. 6 and the tube cap 40 are substantially the same. Obviously the outer diameter of tube cap 40 thus exceeds the inner diameter of the cavities. The tube caps must therefore be forced into the cavities, expanding the inner diameter of the cavity adjacent the cap wall such that the helical bead protrudes into the body about the cavity. The tube cap can thereupon be twisted about its axis within the cavity and form a thread in the foamed body such that the protrusion of the cap is adjustable by twisting the cap within the cavity. The added friction force induced by the head holds the cap securely in the proper protruding attitude despite physical buffeting of the float body.

In the attitude of FIG. 6, all three apertures are open to liquid circulation. As in the previously described embodiment, the tablets within the cap are slightly smaller than the inner diameter of the cap and the cavity such that water may be circulated within the cavity up to the water line 49 of the pool surface. As lower tablets dissolve upper tablets move downwardly to be exposed to the water within the cavity and the cap. The chemical therefore dissolves at a relatively constant rate determined by the amount of liquid circultaing through the apertures.

The circulation rate may be altered in the embodiment of FIGS. 5 and 6 by threading the tube cap into or out of the cavity such that the apertures 44 are wholly exposed or partially or wholly overlapped by the float body material. Aperture 45 always remains open.

In pools of the average volume a chemical package of 16-inch diameter having 12 cavities of approximately 1¼ inches by 3¾ inches deep will supply the requisite amount of chlorine for approximately one month. Extreme agitation of the pool water affects the rate at which the chlorine dissolves and excessive hours of sunlight will require more chlorine than if the skies are generally overcast.

The two embodiments of FIG. 4 and FIG. 6 have utilized chemical tablets. The embodiment of FIGS. 7 and 8 utilizes granules or crystals. In FIG. 7 a toroidal float body 10 has a plurality of cylindrical cavities, such as the cavity 25, with cavity openings in a common plane. Each cavity contains a charge of chemical granules 51 like soluble chlorine. The granules are contained within the cavity by a cap 52. The cap may be a plastic disk having an adhesive layer 53 which is adhered to the float body about the cavities after the cavities are filled.

Each cap 52 has a plurality of partially incised apertures 55. Together the apertures define a gate through which pool water may enter to contact the chemical and the resulting solution be discharged to the pool. The effective area of the gate depends upon the number of apertures punched out prior to immersing the chemical package in the pool water. In FIG. 8 alternate apertures 55 of the outer aperture circle are punched out, as well as the central aperture 55'. Greater circulation and therefore greater dissolving rate may be achieved by punching out the remaining apertures of the cap.

Each of the disclosed embodiments affords a chemical package which not only contains the chemicals but distributes the chemicals to the liquid pool at a predetermined and adjustable rate. The package components are inexpensive and thus lend themselves to a disposable container.

I claim:
1. A package for chemicals soluble in a liquid pool, comprising a solid toroidal float body having a smooth uninterrupted top wall and a bottom wall provided with a circumferentially arranged series of substantially vertical cylindrical cavities, said cavities extending upwardly into the float body and terminating short of the top wall thereof with each cavity including a smooth cylindrical side wall, a plurality of cylindrical caps perforated at their bottom and lower side walls and having their outer side wall in frictional engagement with the lower portion of said smooth cylindrical side walls of said cavities, said cap including an elongated hollow body caapble of supporting a soluble chemical portion therein, said cap further being capable of insertion into the smooth cylindrical side walls of said cavity to an extent sufficient to block at least a portion of the perforations in the side wall of the cap by the cylindrical side wall of the cavity.

2. A package for chemicals soluble in a liquid pool as claimed in claim 1, wherein the cap is exteriorly threaded and one end is arranged to be screwed into the smooth annular walls of the float body.

References Cited

UNITED STATES PATENTS

| | | | |
|---|---|---|---|
| 370,798 | 10/1887 | MacKintosh | 23—267 A |
| 444,500 | 1/1891 | Meyer | 23—267 A |
| 2,455,240 | 11/1948 | Dupler | 23—267 E |
| 3,089,508 | 5/1963 | Schulze | 23—267 E |
| 3,107,156 | 10/1963 | Fredericks | 23—267 A |
| 3,202,322 | 8/1965 | Cleary | 23—267 A |
| 3,483,989 | 12/1969 | Gopstein | 23—267 A |
| 3,495,948 | 2/1970 | Long | 23—267 E |
| 3,607,103 | 9/1971 | Kiefer | 23—267 A |
| 3,598,536 | 8/1971 | Chistensen | 23—267 E |

WILBUR L. BASCOMB, Jr., Primary Examiner

G. J. EMERY, Assistant Examiner

U.S. Cl. X.R.

23—267 E; 222—163; 239—57; 210—242, 169, 198